March 1, 1932.　　　T. W. SHIDLER　　　1,847,103
EXTENSIBLE AUTOMOBILE TRUNK
Filed March 26, 1928
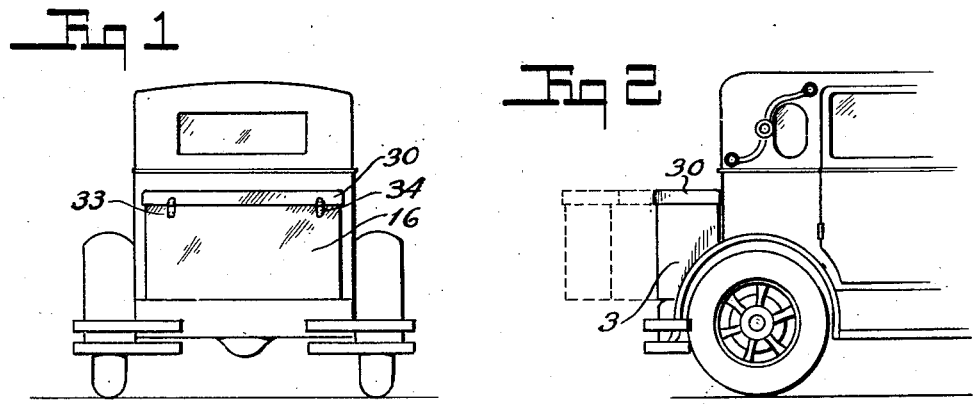
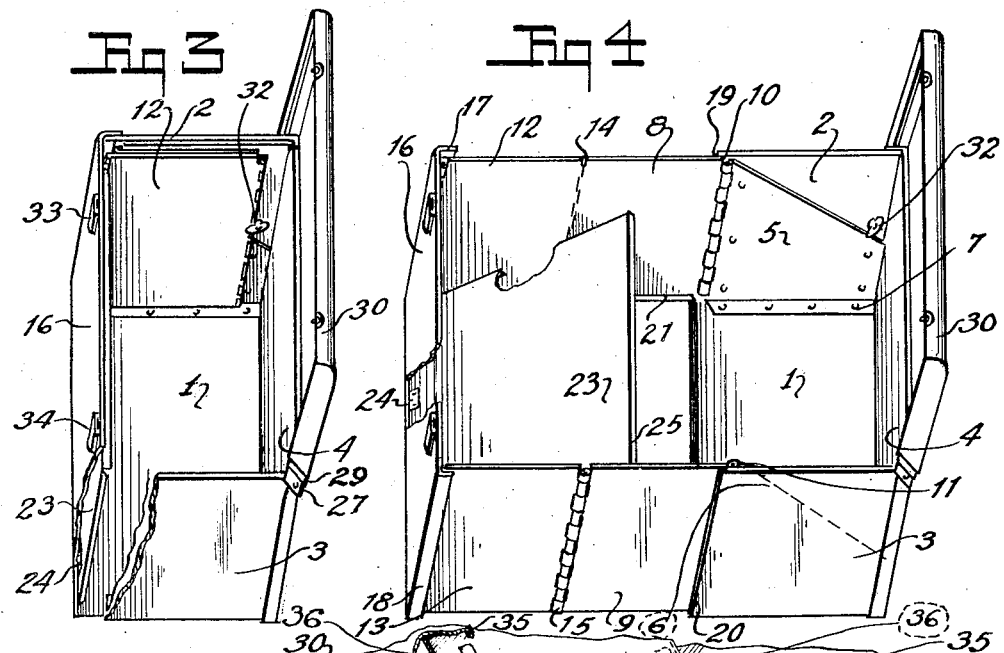
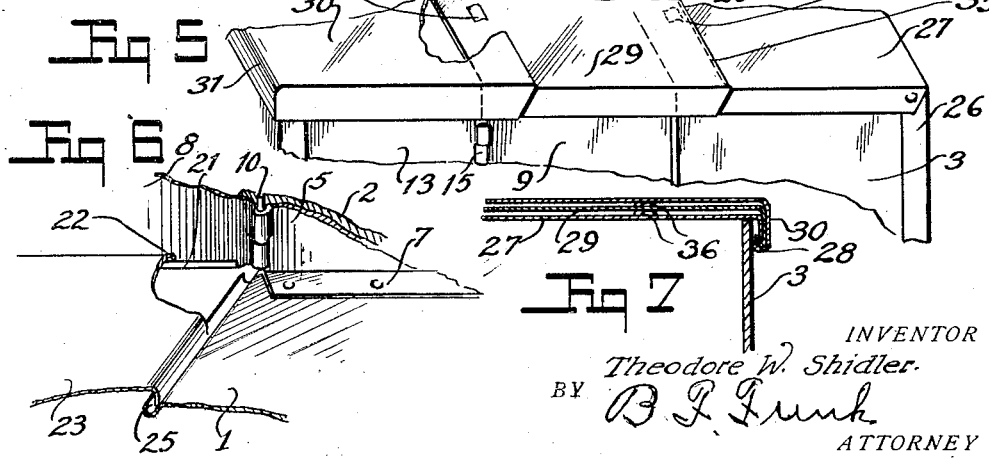
INVENTOR
Theodore W. Shidler.
BY
ATTORNEY Patented Mar. 1, 1932

1,847,103

UNITED STATES PATENT OFFICE

THEODORE W. SHIDLER, OF WICHITA, KANSAS, ASSIGNOR TO ALBERT L. SHIDLER AND HERMAN H. MOOTZ, BOTH OF SIOUX CITY, IOWA

EXTENSIBLE AUTOMOBILE TRUNK

Application filed March 26, 1928. Serial No. 264,888.

This invention relates to automobile trunks or luggage carriers adapted to be fastened to an automobile, preferably to the rear thereof and so constructed that it will be extensible and contractable, the extensibility rendering the trunk adaptable to carry relatively large amounts of material. The trunk is so constructed that the top will be contracted to fit over the trunk body when it is in a contracted state or it may be extended to cover the trunk body when it is extended to enlarge its capacity. The parts are so arranged as to provide an extensible and contractable trunk which will be inexpensive to build and yet have enough strength and rigidity to support relatively heavy weights.

The novelty of the invention will be apparent by reference to the following description in connection with the accompanying drawings in which:

Fig. 1 is a rear view of a motor vehicle to which my invention is attached.

Fig. 2 is a side view of the invention.

Fig. 3 is a perspective view of the invention in its restricted position with the cover raised.

Fig. 4 is a perspective view in its extended position with the cover raised.

Fig. 5 is an enlarged perspective view of the cover in its extended position.

Fig. 6 is a perspective view of the hinge joint for the sides and

Fig. 7 is a sectional view through one wall of the trunk and through the several sections of the cover.

The trunk or luggage carrier is shown as comprising a stationary member consisting of a bottom 1, sides 2 and 3 and a front wall 4. The stationary member may be fastened to an appropriate part on the automobile or motor vehicle by any suitable fastening means such as bolts, rivets, clamps, etc. The rear end of the stationary part is open. Fastened to the inner faces of the ends 2 and 3 are sheets 5 and 6 each having an inturned bottom flange 7 secured to the bottom plate 1. The sheets or panels 5 and 6 constitute anchors for the extensible side plates 8 and 9 which are hinged thereto at 10 and 11. The panels or plates 8 and 9 carry similar panels or plates 12 and 13 which are hinged to the plates 8 and 9 at 14 and 15. The rear edges of the panels or plates 12 and 13 are rigidly connected by a rear plate or panel 16 which has forwardly projecting flanges 17 and 18 adapted to overlap the edges 19 and 20 of the end plates 2 and 3 when the trunk is contracted. Each of the plates 8, 9, 12 and 13 has an inwardly and upwardly turned bottom flange 21 (see Figures 4 and 6) to receive an overlapping flange 22 on each longitudinal edge of the auxiliary bottom plate 23 which is hinged at its rear edge to the bottom edge of the plate 16 as indicated at 24 (see Fig. 4). The forward edge or free edge of the plate 23 has a bent over flange 25 to strengthen the plate 23.

Hinged to the upper edge of the plate 4 at 26 is a trunk top or cover 27 having a bent over flange 28. Similar cover members 29 and 30 are telescopically secured to the member 27 so that when the parts are in the positions shown in Figure 3, the members 27, 29 and 30 will lie parallel one upon the other, but when the parts are in the positions shown in Figure 4, the members 29 and 30 may be extended so as to cover the entire space of the extensible trunk. The member 30 has a rear depending flange 31 to overlap the upper edge of the panel 16.

When the trunk is contracted, the plates 8 and 12 and 9 and 13 will fold inwardly like toggles against the sides or ends 2 and 3 and can be held there by the turn-buttons 32, one for each set of plates although only one is shown. During this time the plate 23 will be folded up against the plate 16, its width being practically co-extensive with the width of the plate 16. The members 27, 29 and 30 of course at this time will be telescoped one upon the other. When it is desired to enlarge the capacity of the trunk, the lid will be raised and the ends or sides will be caused to assume the positions shown in Figure 4, the bottom plate 23 being swung down on to the flanges 21 and the lid extended to the position shown in Fig. 5. Of course, suitable locks or fastening devices can be provided so these are merely indicated as shown at 33 and 34.

It will be apparent that the device can be made of commercial sheet steel in an inexpensive manner and that the trunk may be easily extended or contracted as occasion may demand.

When contracted the trunk will have a neat appearance and when extended it will have a very large capacity and an important feature is that the lid or cover will entirely inclose the contents whether the trunk is contracted or extended. Although, if desirable, the trunk can be extended without utilizing the cover.

It will be observed that the forward edge 35 of each of the sections 29 and 30 is bent downwardly so as to contact with the upstanding stop lugs 36 on the members 27 and 29 respectively. This limits the outwardly sliding movements of the members 29 and 30.

What I claim and desire to secure by Letters-Patent is:—

1. An extensible trunk comprising a stationary member having a bottom wall, a front wall, a pair of side walls, a movable rear wall which remains substantially vertical throughout its entire movement from one position to another, supplemental side walls each comprising two elements hinged together and hinged to said stationary member and to said rear wall and capable of folding movement against said side walls when the trunk is in non-extended position and a movable floor carried by and foldable against the movable wall member when the trunk is in such position.

2. An extensible trunk comprising a stationary member having a botom wall, a front wall, a pair of side walls, a movable rear wall, supplemental side walls each comprising two elements hinged together and hinged to said stationary member and to said rear wall and capable of folding movement against said side walls when the trunk is in non-extended position, a movable floor carried by and foldable against the movable rear wall when the trunk is in such position, the rear edge of said bottom wall and the lower edges of said elements having upturned flanges and the forward edge and side edges of said floor having downturned flanges adapted to coact with the flanges of the bottom wall and elements respectively when the trunk is in extended position.

In testimony whereof I affix my signature.

THEODORE W. SHIDLER.